United States Patent Office 2,883,594
Patented Apr. 21, 1959

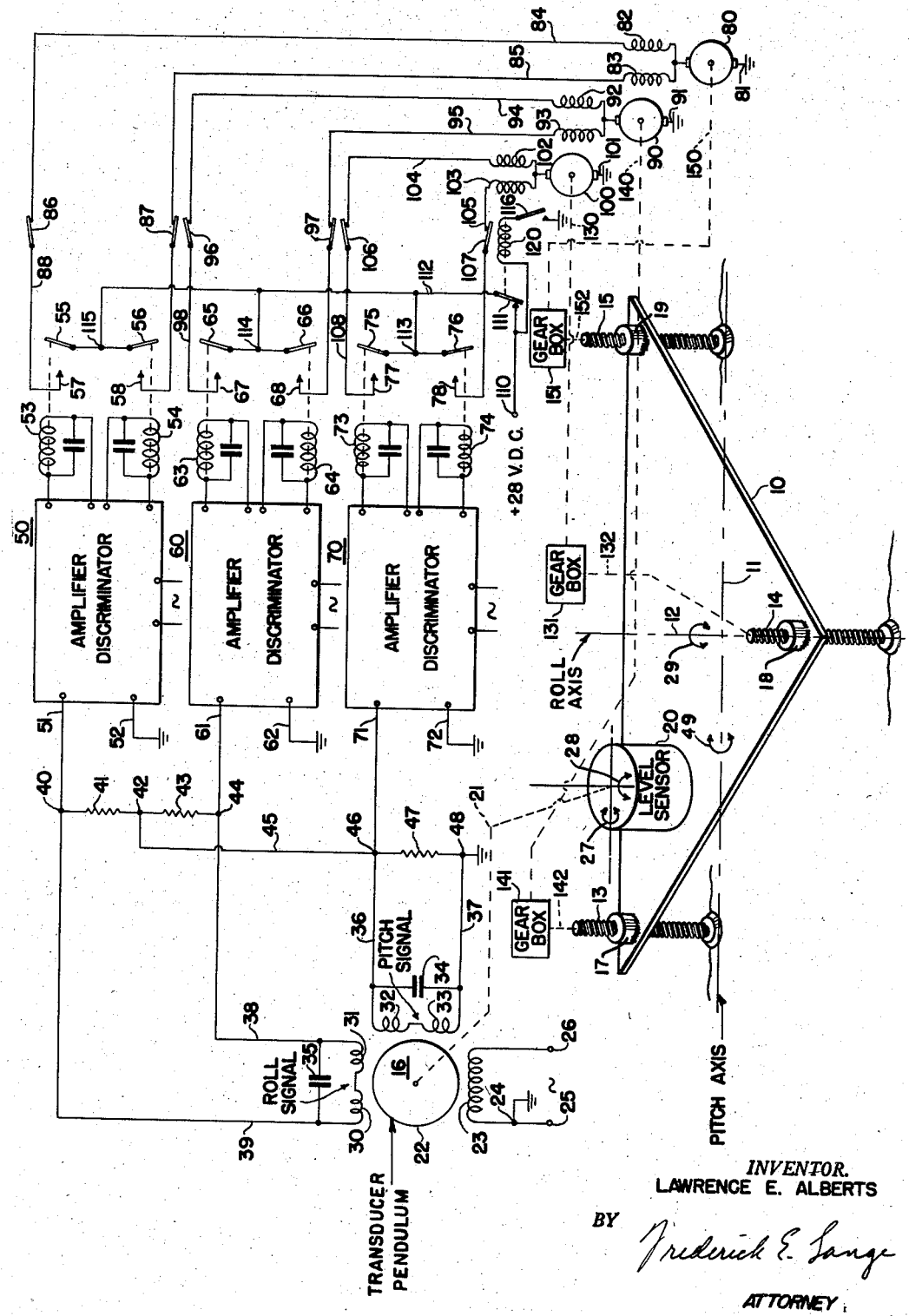

2,883,594
SERVOMOTOR CONTROL SYSTEM ADAPTED FOR STABILIZING

Lawrence E. Alberts, Minneapolis, Minn., assignor to Minneapolis-Honeywell Regulator Company, Minneapolis, Minn., a corporation of Delaware Application April 12, 1956, Serial No. 577,788

9 Claims. (Cl. 318—19)

This invention relates generally to control apparatus. It is more particularly directed to control apparatus for maintaining a plane surface in a predetermined attitude in space.

It is therefore an object of this invention to provide control apparatus for maintaining a predetermined attitude in space, of a plane surface.

It is another object of this invention to provide a means for rapid automatic leveling of a platform such as may be used for surveying or rocket launching.

In previous apparatus of the type disclosed in this invention, it was necessary to provide manual supervision of control members, or actuators, while reading a spirit level so as to attain the desired attitude of the plane, or platform. Further, the procedure in controlling the attitude, using the three points which determine a plane, was to use only two of these points one at a time, for adjusting the attitude. This did not obtain a particularly rapid method of attaining a desired attitude. In my invention I have provided a control apparatus which may utilize all three points simultaneously to quickly reach a desired attitude.

Another object of my invention is to provide control apparatus in which a pair of acutators are operated differentially to adjust the attitude about one axis and the same pair is operated in unison but differentially with respect to a third actuator, to adjust the attitude of the plane surface about another axis.

The invention will be described with reference to the appended drawing in which:

The single drawing is a schematic diagram of my control apparatus embodied in a system for leveling a triangular platform about a pair of perpendicular axes.

In the drawing a level sensing device 20 is affixed to a platform 10 having prependicular coplanar axes shown as a roll axis 12 and a pitch axis 11. The output of level sensor 20 is applied to the input terminals of three amplifier-discriminators 50, 60, and 70 which are connected to provide energization for motors 80, 90, and 100. Motors 80, 90, and 100 are operative to actuate the jacks 13, 14, and 15 shown at the three corners of triangular platform 10. Associated with jacks 13, 14, and 15 are nuts 17, 18 and 19, respectively. The nuts 17, 18 and 19 are rigidly attached to platform 10 for transmission of motion from jacks 13, 14 and 15 to the platform 10.

In platform 10 jacks 13 and 15 are shown affixed to the corners of the platform to the right and left of roll axis 12 and rearwardly of pitch axis 11. Jack 14 is mounted to the front of pitch axis 11 and coincident with roll axis 12. Arrows 49 and 29 indicate the movement of the platform about the perpendicular coplanar pitch and roll axes respectively. Level sensor 20, contains a transducer 16 for providing signals proportional to the deviations of the platform from the desired attitude. The transducer 16 may be of the type generally known in the art as a pendulous microsyn which is a device that senses biaxial deviations from a desired condition and provides a plurality of output signals indicative of the deviations thereof. An example of such a device is a microsyn having a type number 5B001A and is manufactured by the Boston Division of the Minneapolis-Honeywell Regulator Company. Arrows 27 and 28 indicate the movement of transducer 16 in the pitch and roll axes respectively. The transducer referred to, has a pendulum 22, primary winding 23, and secondary windings 30, 31, 32, and 33. Primary winding 23 is provided with terminals 25 and 26 which may be connected to a suitable source of alternating current. Terminal 25 is connected to ground at terminal 24. Secondary windings 30 and 31 are connected in series opposition and are adopted to provide a signal indicative of the roll attitude of platform 10. The secondary windings 32 and 33 are also connected in series opposition and are adopted to provide a signal indicative of the pitch attitude of platform 10. Capacitors 34 and 35 are connected in parallel respectively across secondary windings 32 and 33 and 30 and 31. The output of the series combination of secondary windings 30 and 31 is connected across the combination of resistors 41 and 43, having a terminal 42 at their midpoint, through leads 38 and 39. The output of the series combination of secondary windings 32 and 33 is connected across resistor 47 through lead 36 and terminal 46 and lead 37 and terminal 48. Terminal 48 is also connected to ground.

Amplifier-discriminators 50, 60, and 70 are shown with corresponding numerals for corresponding structure. Amplifier-discriminator 50 includes input terminals 51 and 52, relay windings 53 and 54, stationary relay contacts 57 and 58 and movable relay contacts 55 and 56. Amplifier-discriminator 60 includes input terminals 61 and 62, relay windings 63 and 64, stationary relay contacts 67 and 68 and movable relay contacts 65 and 66. Amplifier-discriminator 70 has input terminals 71 and 72, relay windings 73 and 74, stationary relay contacts 77 and 78, and movable relay contacts 75 and 76. Amplifier-discriminators 50, 60, and 70 are also provided with terminals for connection to a suitable source of alternating current. A terminal 110 is connected to a positive source of direct current and is further connected through normally closed relay contacts 111 to positive lead 112. Movable relay contacts 55 and 56 are connected to positive lead 112 at terminal 115. Movable relay contacts 65 and 66 are connected to positive lead 112 at terminal 114. Movable relay contacts 75 and 76 are connected to positive lead 112 at terminal 113. Positive terminal 110 is also connected to ground through relay winding 120 and normally open switch 116. Relay winding 120 is adopted to open relay contacts 111 when switch 116 is closed.

Amplifier-discriminators 50, 60, and 70 may be of the type shown generally in the Albert P. Upton Patent 2,423,534, issued July 8, 1947 and assigned to the assignee of this application. The general characteristics are such that one or the other of a pair of relays is energized dependent on the phase of a control signal which may be in phase or 180° out of phase with a reference voltage.

Motor 80, having field windings 82 and 83 and an armature ground connection 81, is energized from relay contact 57 associated with amplifier 50 through lead 88, normally closed switch 86 and lead 84. Field winding 83 is energized from relay contact 58 through normally closed switch 87 and lead 85.

Motor 90 having field windings 92 and 93 and an armature ground connection 91, is energized from amplifier-discriminator 60. Field winding 92 is energized from relay contact 67 through lead 98, normally closed switch 96 and lead 94. Field winding 93 is energized from relay contact 68 through normally closed switch 97 and lead 95.

Motor 100, has field windings 102 and 103 and an armature ground connection 101. Field winding 102 is energized from relay contact 77 through lead 108, normally closed switch 106 and lead 104. Field winding 103 is energized from relay contact 78 through normally closed switch 107 and lead 105.

Motor 80 is connected to jack 15 through driving means 150, gear box 151 and driving means 152. Motor 90 is connected to jack 13 through driving means 140, gear box 141 and driving means 142. Motor 100 is connected to jack 14 through driving means 130, gear box 131 and driving means 132.

Normally closed switches 86, 87, 96, 97, 106, and 107 are limit switches which are operaable to remove the power applied to motors 80, 90, and 100 when the mechanical limit of travel of jacks 13, 14, and 15 is reached. The limit switches are mounted on the individual jacks (not shown).

Operation

In describing the operation of the embodiment of my invention shown in the drawing, it will be assumed that the energization of relay windings 53, 63 and 73 and thereby motor field windings 82, 92, and 102 will result in actuation of the jacks associated with each motor in a direction to move the platform up. Likewise the energization of relay windings 54, 64, and 74 will result in actuation of the jacks to move the platform down.

Starting with a level condition of platform 10 and assuming a deviation from level in the roll axis such that the rear right hand corner is depressed and the rear left hand corner is raised, the following operation will result. The pendulum 22 in level sensor 20 will move in a direction to cause an unbalance in the voltages induced in series connected secondary windings 30 and 31 and an alternating current signal will be developed across the combination of resistors 41 and 43. The terminal 40 on resistor 41 will have a signal of opposite phase with respect to terminal 44 on resistor 43. The signal is then applied to amplifier-discriminator 50 in one phase and of opposite phase to amplifier-distriminator 60. It will be noted that the terminal 42 at the junction of resistors 41 and 43 is connected to ground through the lead 45, terminal 46, resistor 47 and ground terminal 48. This will not result in a signal being applied to amplifier-discriminator 70 since the signals developed across resistors 41 and 43 are out of phase and will cancel across resistor 47. The signal applied to input terminal 51 of amplifier-discriminator 50 is of such phase as to energize relay winding 53 so as to close relay contacts 55 and 57. The closing of relay contacts 55 and 57 completes a circuit from positive terminal 110, through relay contact 111, lead 112, terminal 115, relay contacts 55 and 57, lead 88, limit switch 86, lead 84, field winding 82 and motor 80 to ground. The signal applied to input terminal 61 on amplifier-discriminator 60 is of such phase as to energize relay winding 64 and thereby close relay contacts 66 and 68. The closing of relay contacts 66 and 68 completes a circuit from positive terminal 110, through relay contact 111, lead 112, terminal 114, relay contacts 66 and 68, limit switch 97, lead 95, field winding 93 and motor 90 to ground. Motors 80 and 90, being energized for opposite rotation will then operate to cause the rear left corner of the platform 10 to be lowered and at the same time the rear right corner to be raised. The operation of motors 80 and 90 will continue until the platform attains a level position. Since the platform is now level, the pendulum will assume its normal position and there will be no signal output from transducer 16.

Assuming a deviation from a normal level attitude in the pitch axis 11, pendulum 22 will move so as to cause a signal of one phase or the other to be developed across secondary windings 32 and 33. This signal is applied across resistor 47 and to terminal 42 at the midpoint of resistors 41 and 43. This results in a signal at one phase at the input terminals of amplifier-discriminator 70 and a signal of the opposite phase at the input terminals of amplifier-discriminators 50 and 60. This results in the operation of motor 100 in one direction and the operation of motors 80 and 90 in the opposite direction until the platforms attains a level position. It will be obvious to those skilled in the art, that normally the deviation from a level attitude will not occur about any particular axis. Therefore, in the usual operation of my invention, the two operations above described will occur simultaneously and the platform will be leveled about both roll axis 12 and pitch axis 11 at the same time.

Normally closed switches 86, 87, 96, 97, 106, and 107 are provided to prevent injury to jacks 13, 14, and 15 should the platform fail to attain the desired level condition before the mechanical limit of a jack is reached. They are connected so as to remove the power from the motor when the mechanical limit of a jack is reached. Switches 96, 86, and 106 are further provided with a connection (not shown), to normally open switch 116 and are intended as limit switches at the upper end of travel of the jacks. When one of the jacks reaches its upper limit of travel the entire system will be shut down since relay winding 120 is energized by closure of normally open switch 116 to remove the power entirely from all of the motors.

It will be understood that modifications may be made in the design and arrangement of the parts without departing from the spirit of my invention.

What is claimed is:

1. Control apparatus for leveling a platform comprising; first, second and third reversible actuator devices adapted to position a platform about two axes; and control means including an attitude sensing device responsive to the attitude of said platform about said axes, connected to said actuator devices to control the operation of said actuator devices so as to cause said platform to assume a level attitude, said first and second actuator devices being operated differentially to effect a level condition in one axis, and in unison but differentially with respect to said third actuator device to effect a level condition in the other of said axes.

2. Control apparatus for leveling a platform comprising; first, second and third reversible actuator devices adapted to position a platform about two axes; attitude sensing means for providing an output signal indicative of the attitude of said platform about said axes; and control means connected to said attitude sensing means and to said actuator devices and responsive to the output from said attitude sensing means to control the operation of said actuator devices so as to cause said platform to assume a level attitude, said first and second actuator devices being operated differentially to effect a level condition in one axis, and in unison but differentially with respect to said third actuator device to effect a level condition in the other of said axes.

3. Control apparatus for maintaining a platform in a predetermined attitude comprising; first, second and third reversible actuator devices adapted to position a platform about two axes; condition sensing means having an output indicative of the attitude of said platform about said axes; control means connected to said condition sensing means and to said actuator devices and responsive to the output from said condition sensing means to control the operation of said actuator devices in such a manner that said first and second actuator devices are operated differentially to effect a predetermined attitude about one axis and said first and second actuator devices are operated in unison and said third actuator device is operated differentially with respect to said first and second devices to effect a predetermined attitude about the other of said axes.

4. Control apparatus comprising; first and second sources of signal of variable magnitude and reversible sense; first, second and third amplifier means, for controlling the operation of corresponding reversible motors in response to said signals; means connecting said first signal source to said first and second amplifier means in such a manner that said signal is applied in opposite sense to said first and second amplifier means; and means connecting said second signal source to said first, second and third amplifier means in such a manner that said second signal is applied in the same sense to said second amplifier means and in an opposite sense to said third amplifier means.

5. Control apparatus comprising; first and second sources of signal of variable magnitude and reversible sense; first, second and third amplifier means each having input and output terminals; first and second impedance means, said first impedance means having a center tap; means interconnecting corresponding input terminals on each of said amplifier means; means connecting said first impedance means intermediate corresponding input terminals of said first and second amplifier means so that said first signal is applied in opposite sense to said first and second amplifier means; means connecting one extremity of said second impedance means to the interconnected input terminals on said first, second and third amplifier means; means connecting the other extremity of said second impedance means to the other input terminal of said third amplifier means and to the center tap on said first impedance means so that said second signal is applied in the same sense to said first and second amplifiers and in an opposite sense to said third amplifier; means connecting said first source of signal to said first impedance means; means connecting said second source of signal to said second impedance means; and reversible motor means connected to the output terminals of each of said amplifier means.

6. Control apparatus comprising; first and second sources of signal of reversible phase and variable magnitude; first, second and third amplifier-discriminator means each having input and output terminals; first and second impedance means, said first impedance means having a center tap; means connecting said first impedance means intermediate corresponding input terminals of said first and said second amplifier-discriminator means; means connecting one extremity of said second impedance means to an input terminal of said third amplifier-discriminator means and to said center tap on said first impedance means; means directly connecting the other extremity of said second impedance means and the other input terminal of each of said amplifier-discriminator means; means connecting said first source of signal to said first impedance means; means connecting said second source of signal to said second impedance means; and reversible motor means connected to the output terminals of each of said amplifier-discriminator means.

7. Apparatus for leveling a platform about plural axes comprising: a platform; condition sensing means providing a first source of signal indicative of a departure from level attitude in one axis and a second source of signal indicative of a departure from a level attitude in another axis; first, second and third amplifier means; circuit means connecting said first source of signal to said first and second amplifier means so that said amplifier means are operative differentially in response to said signal; circuit means connecting said second source of signal to said first, second and third amplifier means so that said first and second amplifier means are operated in unison and said third amplifier means is operative differentially with respect to said first and second amplifier means; reversible actuator-motor means controlled by said amplifier means in response to said signals affixed to said platform on opposite sides of corresponding control axes so as to provide a rapid leveling action of said platform.

8. Control apparatus for maintaining a platform in a predetermined attitude comprising; first and second sources of signal of variable magnitude and reversible sense for indicating a departure from a predetermined attitude about plural axes; first, second and third amplifier means; reversible motor means connected to each of said amplifier means for adjusting the attitude of said platform in response to said signals; means connecting said first source of signal to said first and second amplifier means so as to energize said amplifier means in an opposite sense; and means connecting said second signal to said first, second and third amplifier means so as to energize said first and second amplifier means in the same sense and to energize said third amplifier means in an opposite sense with respect to said first and second amplifier means.

9. Platform leveling apparatus comprising; bi-directional pendulous sensing means for providing a first source of signal indicative of a departure from a level attitude in roll and a second source of signal indicative of a departure from a level attitude in pitch; first, second and third amplifier-discriminator means each having input and output terminals; circuit means directly connecting one of each of said input terminals; first and second impedance means, said first impedance means having a center tap; circuit means connecting said first source of signal to the extremities of said first impedance means and further circuit means connecting one extremity to the other input terminal on said first amplifier-discriminator means and the other extremity to the other input terminal on said second amplifier-discriminator means; circuit means connecting said second source of signal to the extremities of said second impedance means including means connecting one extremity to one input terminal on said third amplifier and to the center tap on said first impedance means and means connecting the other extremity of said second impedance means to the other input terminal; first, second and third relay means; first, second and third reversible motor means; first, second and third actuators for adjusting the attitude of said platform; means, including speed reduction means, connecting said actuators to said motor means; mounting means for affixing said actuators to a platform in triangular relationship; and circuit means connecting said first, second and third relay means intermediate the output terminals on said first, second and third amplifier-discriminator means, and said first, second and third motor means, said relay means having contacts for causing reversible operation of said motor means in response to the sense of said sources of signal whereby said first source of signal will cause differential operation of said first and second actuators and said second source of signal will cause operation of said first and second actuators in unison and differential operation of said third actuator with respect to said first and second actuators.

No references cited.